(12) United States Patent
Bierhuizen

(10) Patent No.: US 6,558,005 B1
(45) Date of Patent: May 6, 2003

(54) PROJECTION DISPLAY DEVICE COMPRISING AN INTEGRATOR DEVICE PROVIDED WITH A TUNNEL PRISM

(75) Inventor: Serge Joel Armand Bierhuizen, Wilsonville, OR (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/763,844

(22) PCT Filed: Jun. 23, 2000

(86) PCT No.: PCT/EP00/05886

§ 371 (c)(1),
(2), (4) Date: Feb. 27, 2001

(87) PCT Pub. No.: WO01/01703

PCT Pub. Date: Jan. 4, 2001

(30) Foreign Application Priority Data

Jun. 28, 1999 (EP) ............................................. 99202062

(51) Int. Cl.[7] ............................................. G03B 21/28
(52) U.S. Cl. ........................................... 353/81; 353/98
(58) Field of Search ............................... 353/38, 81, 98

(56) References Cited

U.S. PATENT DOCUMENTS 3,296,923 A * 1/1967 Miles .......................... 352/198
3,508,822 A * 4/1970 Cornell et al. ................. 353/44
5,826,959 A * 10/1998 Atsuchi ........................ 353/20
6,142,633 A * 11/2000 Takahara et al. ................ 349/9
6,217,173 B1 * 4/2001 Huang et al. .................... 349/9
6,309,073 B1 * 10/2001 Nakayama et al. ............. 353/20

FOREIGN PATENT DOCUMENTS

WO    WO9745768    12/1997    ........... G03B/21/00

* cited by examiner

Primary Examiner—Russell Adams
Assistant Examiner—D. Ben Esplin
(74) Attorney, Agent, or Firm—Dicran Halajian

(57) ABSTRACT

Projection display device which comprises a light source for generating a light beam, integrator means for converting the light beam into a uniform rectangular beam, modulator means for modulating the rectangular light beam with the information to be displayed, and projection means for projecting the modulated rectangular light beam on a display plane.

The integrator means comprises a triangular prism and an integrator device positioned between the light source and the triangular prism.

The triangular prism is arranged for total internal reflection on at least one or more of its non-folding planes or, for best optical performance, on all of its non-folding planes.

20 Claims, 2 Drawing Sheets

PROJECTION DISPLAY DEVICE COMPRISING AN INTEGRATOR DEVICE PROVIDED WITH A TUNNEL PRISM

FIELD OF THE INVENTION

The invention relates to a display device comprising a light source device for generating a light beam, an integrator device for converting the light beam from the light source device into a uniform rectangular light beam, a modulator device for modulating the rectangular light beam from the integrator device with image information to be displayed, and a projection device for projecting the rectangular light beam from the modulator device on a display plane, the integrator device comprising a folding member and an integrator member arranged between the light source device and the folding member.

BACKGROUND OF THE INVENTION

A display device of this type is known from WO 97/45768.

In the known display device, the integrator member comprises two parallel integrator plates, each having a plurality of lenses arranged in a plane perpendicular to a major axis of the light beam emitted from the light source device, while the folding member comprises a reflecting mirror and a lens and the modulator device comprises a beam-splitting prism, a color-splitting and synthesizing prism, and three reflecting liquid crystal display panels.

By using a folding member, a more compact structure of the display device can be obtained as compared with a structure without a folding member.

Since the reflecting mirror of the folding member is not arranged between the integrator plates of the integrator member, the integrator plates may be arranged closer together and may consequently comprise a larger number of lenses while maintaining a given throughput, which will enhance the image quality of the projected image.

As regards the known display device, it is desirable to cause the light between the liquid crystal display panels and the projection device to be telecentric with a view to the angle dependence of the filter functions of the dichroics used in the color-splitting and synthesizing prism, which is much stronger in glass or synthetic material than in air, and the reflection/voltage characteristics of the liquid crystal display panels.

To obtain this desired telecentricity, the integrator plate which is most adjacent to the reflecting mirror should be arranged in the focal plane of the lens of the folding member.

SUMMARY OF THE INVENTION

With a view to the tendency of progressing miniaturization, in which a lamp having a light arc length of 1 mm for the light source device and liquid crystal panels with a diagonal of 2.3 cm (0.9 inch) are considered in 1999, it will be more and more desirable to move the lens of the folding member to a position between said prisms of the modulator device. In this case, however, the use of the reflecting mirror in the folding member inhibits an optimally compact geometry.

It is an object of the invention to improve the known display device in such a way that it has both an optimal compact geometry at a progressing miniaturization and a high display image quality.

To this end, the present invention provides a display device of the type described in the opening paragraph, which is characterized in that the folding member comprises a triangular prism adapted for total internal reflection on at least one or more of its non-folding planes or, for best optical performance, on all of its non-folding planes.

In this way, the triangular prism may operate both as a folding member and as an optical tunnel member so that a tunnel prism is concerned, ensuring that the beam exiting from the tunnel prism is geometrically identical to the beam entering the tunnel prism and, consequently, the exiting beam of the most adjacent integrator plate when using the integrator member with two parallel integrator plates. In other words, the image properties for a window to infinity are the same in the latter case as at the output of the most adjacent integrator plate.

For reasons of costs, an acceptably less than best optical performance may be chosen. Alternatively, the tunnel prism could also be adapted for total internal reflection on its folding plane.

It is to be noted that it has been proposed to modify the known display device in such a way that the reflecting mirror of the folding member is replaced by a triangular prism arranged between, and in contact with, the integrator plates which are then arranged at an angle. However, the result then is that the integrator plates are arranged at a larger distance from each other so that the number of lenses which can be used in the integrator plates at an equal throughput will then be smaller, with the attendant deterioration of the displayed image quality. However, the use of the triangular prism instead of a reflecting mirror between the integrator plates is in itself more favorable because in the first-mentioned case a larger number of lenses proportional to the refractive index of the material of the triangular prism can be used in the integrator plates.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE INVENTION

Figure 1:
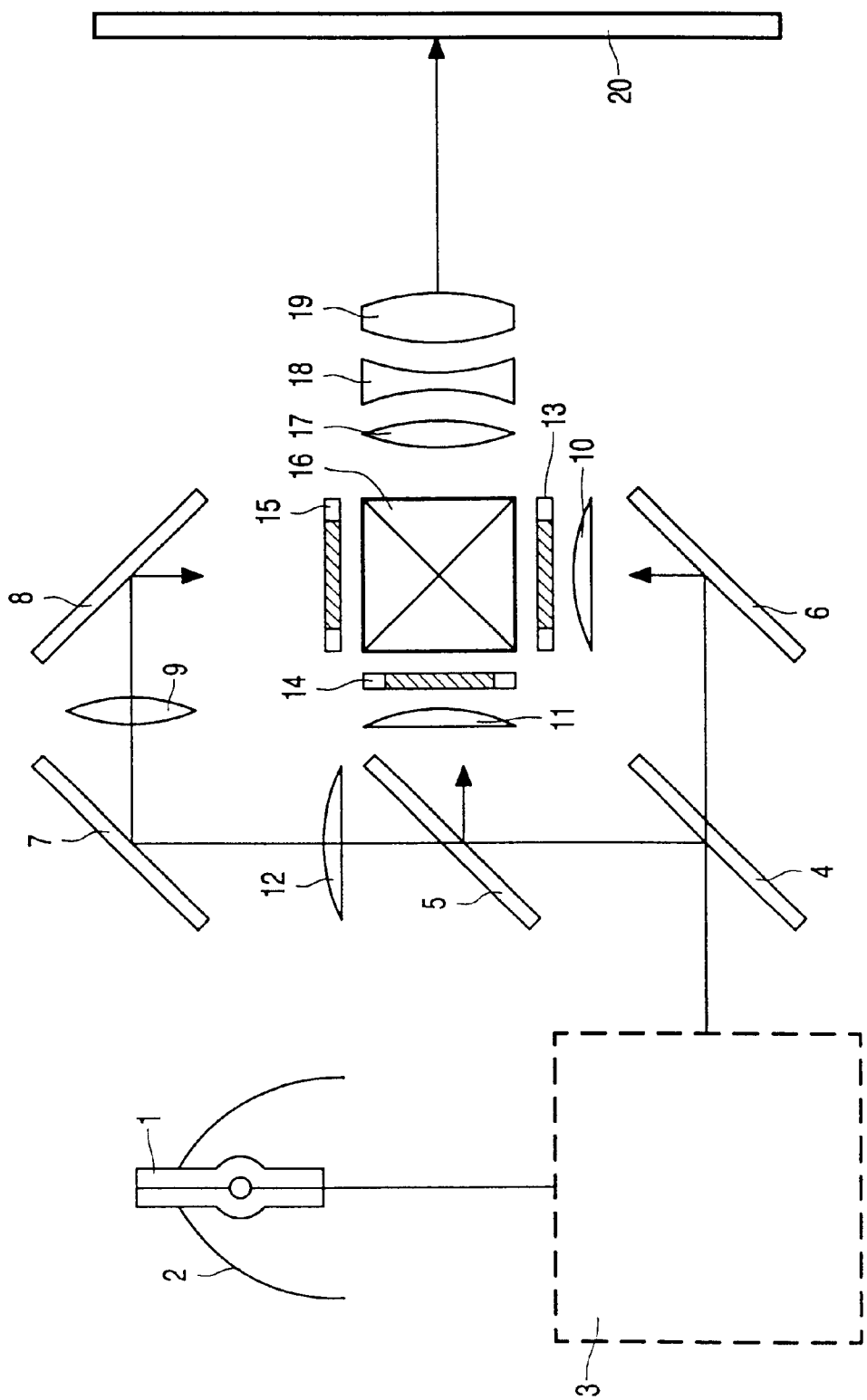
FIG. 1 shows diagrammatically a conventional embodiment of a projection device in which the present invention may be used.

More particularly, FIG. 1 shows diagrammatically a color version of a projection display device of the transmissive LCD type. However, the invention may be used for all other possible types as far as an integrator device for generating a uniform rectangular light beam is used, which in itself is conventional. An alternative projection display device may have, for example, reflecting LCD panels instead of transmissive LCD panels, or a DMD panel. Generally, the display device comprises one, two or three display panels.

With reference to FIG. 1, the display device shown in this Figure comprises a light source device with a lamp 1 and a reflector 2. An integrator device 3 converts a light beam generated by the light source device 1, 2 into a uniform rectangular light beam and folds this beam in this case through an angle of $\pi/2$ rad.

Dichroic mirrors 4 and 5 constitute the splitting means of the modulator device for splitting the rectangular light beam from the integrator device 3 into rectangular primary color light beams which are collimated by means of a dichroic mirror 5 and reflecting mirrors 6, 7, 8, condenser lenses 10, 11 and 12 and an intermediate lens 9, and are imaged and directed onto transmitting liquid crystal panels 13, 14 and 15 so as to separately modulate the primary color light beams with respective parts of the color image information to be displayed.

A dichroic prism 16 synthesizes the modulated primary color beams into a single color beam which is projected on a display plane 20 by the projection device comprising lenses 17, 18 and 19.

When using a DMD panel, the primary color beams are generated one after the other, for example, by means of a color wheel and are projected one after each other on the display plane 20 by the projection device 17–19 after modulation by the DMD panel and are, in fact, synthesized by the human eye. Instead of a color wheel, a color shutter or rolling color bars may be used alternatively.

Another possibility is to use an RGB color filter pattern or ACS.

For descriptive purposes, it is assumed that the modulator device comprises the splitting means 4, 5, the reflecting mirrors 6–8, the intermediate lens 9, the condenser lenses 10–12, the LCD panels 13–15 and the dichroic prism 16.

Figure 2:
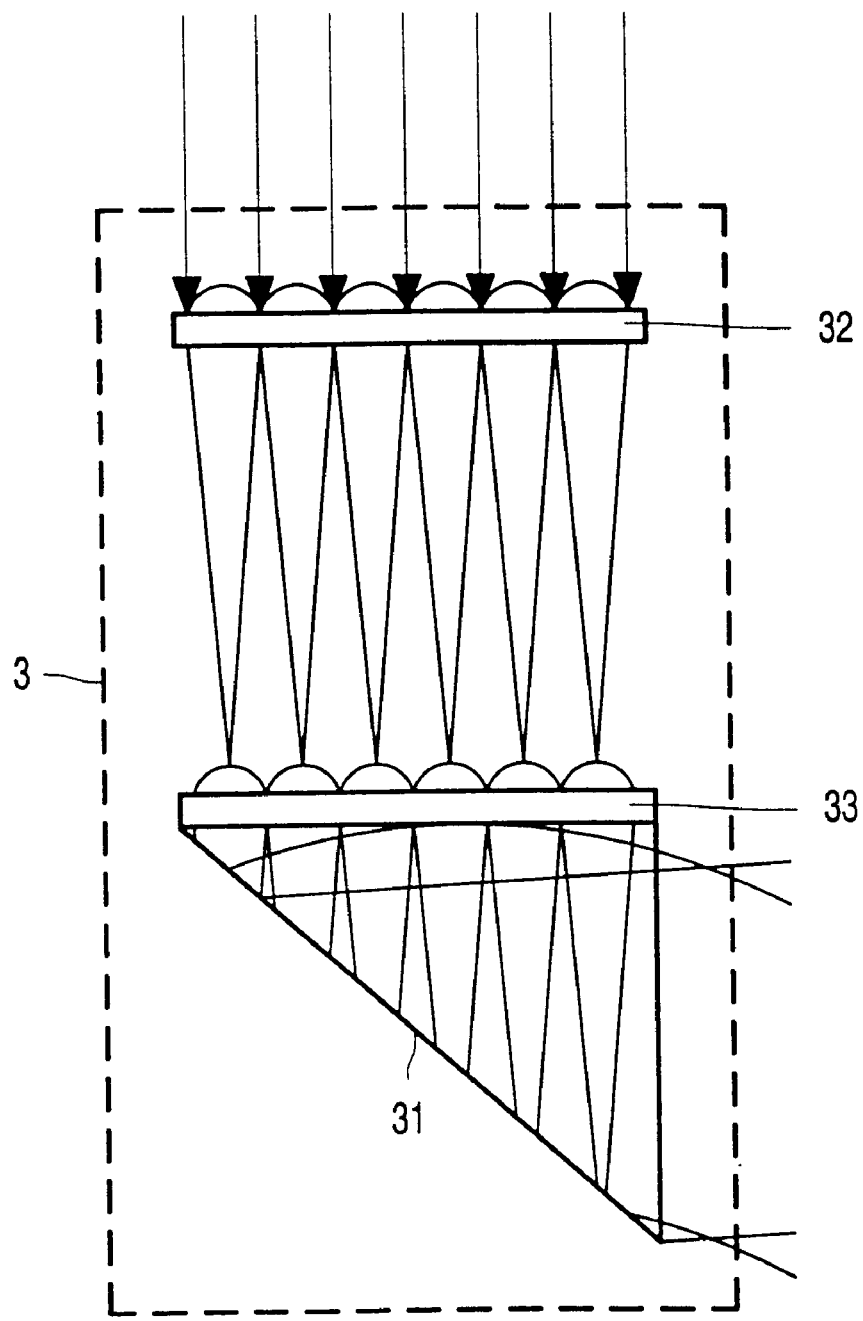
FIG. 2 shows the integrator device of FIG. 1, in which the invention is used.

FIG. 2 shows diagrammatically an embodiment of the integrator device 3 in greater detail. Integrator device 3 comprises a triangular prism 31 (as a folding member) which, for best optical performance, is adapted for total internal reflection on at least all of its non-folding planes and which will hereinafter be referred to as tunnel prism 31. Moreover, the integrator device 3 comprises two parallel integrator plates 32 and 33 (as an integrator member) arranged between the light source device 1, 2 of FIG. 1 and the tunnel prism 31, each plate comprising a plurality of lenses arranged in a plane perpendicular to a major axis of the light beam emitted from the light source device 1, 2, which lenses may be arranged in the conventional manner, for example, in the form of a matrix. Alternatively, the integrator member may be a bar integrator having, for example, a square entrance face and a rectangular exit face.

Particularly, the reflector 2 of FIG. 1 may be a parabolic reflector and the light arc of the lamp 1 is then placed in the focus of the parabolic plane of the reflector 2, so that the beam reflected by the reflector 2 is substantially parallel to the central axis of the light source device 1, 2. The integrator plates 32 and 33 may then have the same size, and their lenses may have the same focal length. Rectangular lenses of integrator plate 33, which is most adjacent to the tunnel prism 31, form an image of corresponding rectangular lenses of the integrator plate 32 at an infinite distance. Consequently, a lens (not shown) for forming the image on the liquid crystal panels 13–15 at an infinite distance is arranged in this case between the tunnel prism 31 and the modulator device 4–16 of FIG. 1, with the focal length of the lens being chosen to be equal to the distance between this lens and the liquid crystal panels 13 and 14. Without a fold in the integrator device 3, this lens would have been placed behind the integrator plate 33, or it could have been integrated therewith. By using the tunnel prism 31, a fold is realized, which does not need to have any consequences for the properties of the white light beam from the integrator plate 33. The entrance face of the tunnel prism 31 preferably has the same dimensions as the exit face of the integrator member, in this case the most adjacent of the integrator plates, namely integrator plate 33. Integrator plate 33 may be secured to the tunnel prism 31.

The tunnel prism 31 may be a body of glass or synthetic material. If necessary or desirable, one or more faces of the tunnel prism 31 may be coated with a light-reflecting layer. Alternatively, the tunnel prism 31 may be a hollow prism with reflecting walls.

By using tunnel prism 31, the integrator device 3 can ensure light beam folding without a folding member being required between the integrator plates 32, 33, so that the distance between the integrator plates 32, 33 can be chosen with a view to the desired number of lenses of the integrator plates 32, 33, while the tunnel prism 31 folding the beam and not being arranged between the integrator plates 32, 33 provides a rectangular light beam which is geometrically identical to the exiting beam of the most adjacent integrator plate 33, hence identical to the case where there would be no tunnel prism 31.

What is claimed is:

1. A display device comprising a light source device for generating a light beam, an integrator device for converting the light beam from the light source device into a uniform rectangular light beam, a modulator device for modulating the rectangular light beam from the integrator device with image information to be displayed, and a projection device for projecting the rectangular light beam from the modulator device on a display plane, the integrator device comprising a folding member and an integrator member with two integrator plates, said two integrator plates being arranged between the light source device and the folding member, wherein the folding member comprises a triangular prism which is adapted for total internal reflection on at least one or more of its non-folding planes.

2. A display device as claimed in claim 1, wherein the triangular prism comprises a body of glass or synthetic material.

3. A display device as claimed in claim 2, wherein one or more faces of the triangular prism are coated with a light-reflecting layer.

4. A display device as claimed in claim 1, wherein the triangular prism comprises a hollow prism with reflecting walls.

5. A display device as claimed in claim 1, wherein the entrance face of the triangular prism has the same dimensions as the exit face of the integrator member.

6. A display device as claimed in claim 1, wherein the two integrator plates are parallel, each of the integrator plates having a plurality of lenses arranged in a plane perpendicular to a major axis of the light beam emitted from the light source device.

7. A display device as claimed in claim 6, wherein the most adjacent of the integrator plates is secured to the triangular prism.

8. A display device as claimed in claim 1, wherein the modulator device comprises at least one display panel.

9. A display device as claimed in claim 8, wherein the modulator device comprises splitting means for splitting the rectangular light beam from the integrator device into rectangular primary color light beams, and the modulator device is adapted to separately modulate the primary color light beams.

10. A display device as claimed in claim 1, wherein said triangular prism is adapted for total internal reflection on all of its non-folding planes.

11. A display device as claimed in claim 1, wherein said triangular prism is further adapted as an optical tunnel so that a light beam exiting from said optical tunnel is substantially identical to a beam entering said optical tunnel.

12. A display device as claimed in claim 1, wherein the integrator member comprises integrator plates, and wherein said triangular prism is further adapted as an optical tunnel so that light beam folding occurs without a folding device between said integrator plates.

13. A display device as claimed in claim 1, wherein the integrator member comprises integrator plates, and wherein said triangular prism is further adapted as an optical tunnel to provide light beam folding without a folding device between said integrator plates so that a distance between said integrator plates can be chosen to allow a desired number of lenses.

14. A display device as claimed in claim 1, wherein the integrator member comprises two integrator plates, each having a plurality of lenses, each of said plurality of lenses having a substantially identical size and focal length.

15. A display device comprising:

a light source device for generating a light beam;

an integrator device for converting the light beam into a uniform light beam;

a modulator device for modulating the uniform light beam to form a modulated beam; and a projection device for projecting the modulated beam on a display plane;

wherein the integrator device comprises a folding member and an integrator member with two integrator plates, said two integrator plates being arranged between the light source device and the folding member; the folding member comprising a triangular prism which is adapted for total internal reflection on at least one or more of its non-folding planes.

16. A display device as claimed in claim 15, wherein said triangular prism is adapted for total internal reflection on all of its non-folding planes.

17. A display device as claimed in claim 15, wherein said triangular prism is further adapted as an optical tunnel so that a light beam exiting from said optical tunnel is substantially identical to a beam entering said optical tunnel.

18. A display device as claimed in claim 15, wherein the integrator member comprises integrator plates, and wherein said triangular prism is further adapted as an optical tunnel so that light beam folding occurs without a folding device between said integrator plates.

19. A display device as claimed in claim 15, wherein the integrator member comprises integrator plates, and wherein said triangular prism is further adapted as an optical tunnel to provide light beam folding without a folding device between said integrator plates so that a distance between said integrator plates can be chosen to allow a desired number of lenses.

20. A display device as claimed in claim 15, wherein each of the two integrator plates has a plurality of lenses, each of said plurality of lenses having a substantially identical size and focal length.

\* \* \* \* \*